Nov. 8, 1960

H. NASSENSTEIN 2,959,348

APPARATUS FOR THE AUTOMATIC COUNTING AND
DETERMINING PARTICLE SIZE DISTRIBUTION

Filed June 25, 1954

INVENTOR.
HEINRICH NASSENSTEIN

BY *Burgess & Dinklage*

ATTORNEYS

Nov. 8, 1960  H. NASSENSTEIN  2,959,348
APPARATUS FOR THE AUTOMATIC COUNTING AND
DETERMINING PARTICLE SIZE DISTRIBUTION
Filed June 25, 1954  5 Sheets-Sheet 2

INVENTOR.
HEINRICH NASSENSTEIN
BY Burgess & Dinklage
ATTORNEYS

Nov. 8, 1960 H. NASSENSTEIN 2,959,348
APPARATUS FOR THE AUTOMATIC COUNTING AND
DETERMINING PARTICLE SIZE DISTRIBUTION
Filed June 25, 1954 5 Sheets-Sheet 5

INVENTOR.
HEINRICH NASSENSTEIN
BY
ATTORNEYS

United States Patent Office 2,959,348
Patented Nov. 8, 1960

2,959,348

APPARATUS FOR THE AUTOMATIC COUNTING AND DETERMINING PARTICLE SIZE DISTRIBUTION

Heinrich Nassenstein, Opladen, Germany, assignor to Farbenfabriken Bayer Aktiengesellschaft, Leverkusen, Germany, a corporation of Germany Filed June 25, 1954, Ser. No. 439,404

Claims priority, application Germany June 26, 1953

7 Claims. (Cl. 235—92)

The invention relates to an apparatus for automatically counting and determining the size distribution of particles, wherein the particles or their optically produced images are passed along a measuring device or this measuring device is passed along the particles or their optically produced images. This counting and measuring of particles can, for example, be carried out in the known manner in that a picture of the particles to be counted is mounted on a glass cylinder illuminated from within and as the glass cylinder is advanced a definite distance with each rotation, the pictures of the particles, their images conveyed through a lens, pass in a line along the measuring device. The particles to be measured may, for instance, be objects of microscopical size, such as dust or powder particles or droplets or images on microphotographs. Previously known apparatus (W. H. Walton, "Automatic Counting of Microscopic Particles," Nature, 169 (1952), pages 518–520) for counting and sizing particles suffer at least from one of the following disadvantages:

(1) They are restricted to the counting and sizing of areas of circular shape;

(2) The determination of the complete size distribution requires repetitive scanning;

(3) They do not measure the size distribution directly but size distribution must be calculated from the measured values, which often requires a calculating machine;

(4) Suppositions, on which such calculation is based, are not always fulfilled;

(5) The relation between the measured value and the actual size of the individual area is not accurately known;

(6) They require a relatively large expenditure of equipment. For instance, most of the known apparatus require a pulse height analyser which must be designed as a multiple channel analyser if a single scanning operation shall be sufficient.

In accordance with the present invention it has been found that the disadvantages hereinbefore set forth can be avoided by the use of a measuring device containing a number of photo-electric devices which are responsive to scanning light or dark areas of particle images to create electric impulses of which as many respond, one or more times, when the particle images pass along the measuring device, as correspond to the size of the particle. These photo-electric devices of the measuring device are designed so that they respond to exposure to light or to dark areas of particle images depending upon whether the particle images appear light on a dark background or dark on a light background. By combining the herein described apparatus with the apparatus described in the specification of my co-pending application Ser. No. 439,403, filed on June 25, 1954, every particle can, for instance, be measured once. The photo-electric device of the measuring device can be arranged in a line which runs vertical to the direction of movement of the particle. The particle size which is thereby measured is equal to the diameter when the particle is of circular shape; the size of particles of irregular shape is either equal to the statistical diameter according to Feret or almost equal to the statistical diameter according to Martin depending upon the length of the measuring means (see Herdan, "Small Particle Statistics"; Amsterdam (1953) page 66). The circuit can be closed so that each photo-electric device, such as a photo-electric element will operate a counting means only after all the elements arranged in the row of the elements in front of this element have responded. For instance, if a microphotograph of droplets is scanned in this manner and the photo-electric elements of the measuring means are all mounted at a distance of 1 millimeter from one another, the first counting means counts all the droplets; the second counting means counts all the droplets having a diameter larger than 1 millimeter; the third counting means counts the droplets having a diameter larger than 2 millimeters. As a rule, the $n$th counting means counts all the droplets having a diameter larger than $n-1$ millimeter. Hence, it follows that the counting means indicates the complete size distribution of the droplets immediately without any calculation. The photo-electric devices may also be connected in such a manner that only the last of these devices, which are exposed to a light or dark area of a particle image, as the case may be, can actuate a counting means.

The photo-electric devices may be electrode pairs with intermediate photo resistances i.e. photo-conductive cells, or may be cells with external photo-electric effect i.e. photo-emissive cells, or may be the photo cathodes of such cells. Moreover, these devices may be designed as photo-elements. All the members of the measuring device as well as the members of the photo-electric apparatus described in the specification of my aforesaid co-pending application (which elements bring about an accurately known number of measurements of every individual particle) can be combined into one cell.

With specific reference to copending application, Serial No. 439,403, filed June 25, 1954, a photo-electric apparatus is provided having a recording means and two linear means. The recording means is capable of delivering an electric pulse activating a counting device occasioned by scanning a light or dark area of a particle image only if no area between said recording means and two linear means of the photo-electric apparatus, situated in the scanning direction and responsive to such light and dark particle image areas, is continuously exposed to a light or dark area of a particle image, depending upon whether the particle images appear light on a dark background or dark on a light background. The linear means are arranged parallel to the direction of scanning; when seen in the direction of scanning, one of these means begins on the same level and at a distance as small as possible behind the recording means; the second linear means is, when seen vertically to the scanning direction, arranged at a distance from the recording means, the said distance being no greater than the distance between adjacent scanning lines.

As long as there is such a continuously exposed area between the recording means and one of the linear means, the recording means cannot operate the counting device. In contrast to the known apparatus, the linear means alone cannot automatically block the counting pulse of the recording means during exposure but only if there is at least one area between the recording means and at least one of the linear means which is continuously exposed as aforesaid. By this arrangement it is safely insured that every particle, independently of its size and shape, is counted as often as the interlacing in scanning is contained in the distance between the recording the recording means and the second linear means, i.e., every particle is counted only once for instance if the interlacing in scanning is equal to the distance between the recording means and the second linear means.

This is true for the following reason: every particle image has one point which, vertically with respect to the scanning direction, is the deepest. When this point of the particle image reaches the recording means of the photo-electric apparatus the counting device is operated. In the next scanning line, the deepest point of the particle image is always beneath the second linear means provided that the interlacing is equal to the distance between the recording means and the second linear means. On the passage of the particle image across the path of the recording means in said next scanning line there is now an area between the recording means and the second linear means, which area is continuously exposed to that portion of the particle image situated above the second linear means; the electric pulse of the recording means, which otherwise operates the counting device, is thereby blocked so that a second counting of the particles does not take place.

The purpose of the linear means, which, when seen in scanning direction, is placed behind the recording means, is to prevent the multiple counting of the particles, even when irregularly shaped. If the shape of the particle to be counted has, for instance, two deepest points at the same level, no pulse actuating the counting device is delivered at the instant the second deepest point travels over the recording means, because the first deepest point of the particle is at the same moment beneath this linear means, and, therefore, an area between the recording means and this linear means is continuously exposed. The same applies mutatis mutandis to dark particles on a light ground. The particle as such prevents multiple counting by forming a bridge over the area between the recording means and the linear means.

The means of the photo-electric apparatus may be designed as electrodes, and the intermediary area of the apparatus as a layer with an inner photo-electric effect, i.e., a photo-conductive layer. The recording means may consist of two electrodes placed immediately side by side and connected through a photo-conductive layer and the linear means may each comprise individual electrodes.

Thus, an accurate measurement of each particle will occur when the distance between the lowermost linear means and the recording means is equal to the increment of interlacing between scanning lines, so that every particle will be counted for measurement only once. On the other hand, if the increment of scanning interlacing amounts to one-half of this distance, every particle will be counted twice, and if the increment of scanning interlacing amounts to $\frac{1}{20}$ of this distance, every particle will be counted 20 times.

The circuits for the recording means and the two linear means may be more fully appreciated when combined with the particle measuring apparatus in accordance with the invention as will be apparent from the description below.

In the apparatus, which is illustrated by way of example in the accompanying drawings, the scanning direction is vertical to the row of the photo-electric devices and—

Figure 1:
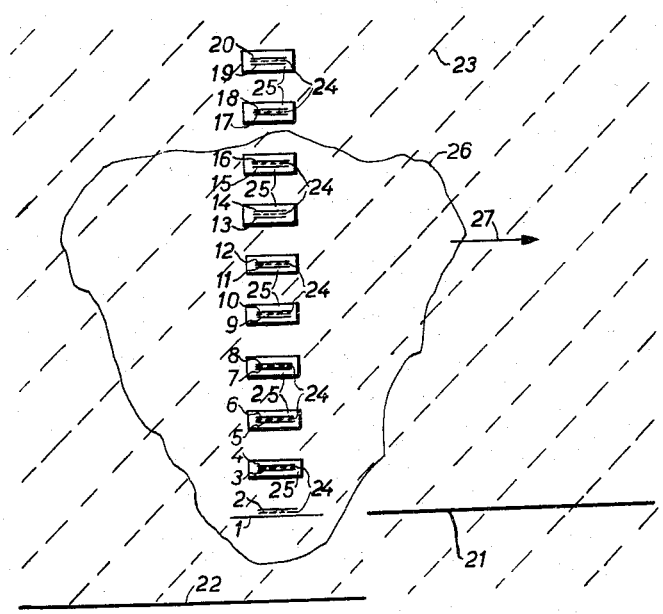
Fig. 1 is a plan view of the measuring device with the photoelectric devices shown in vertical arrangement.
Figure 2:
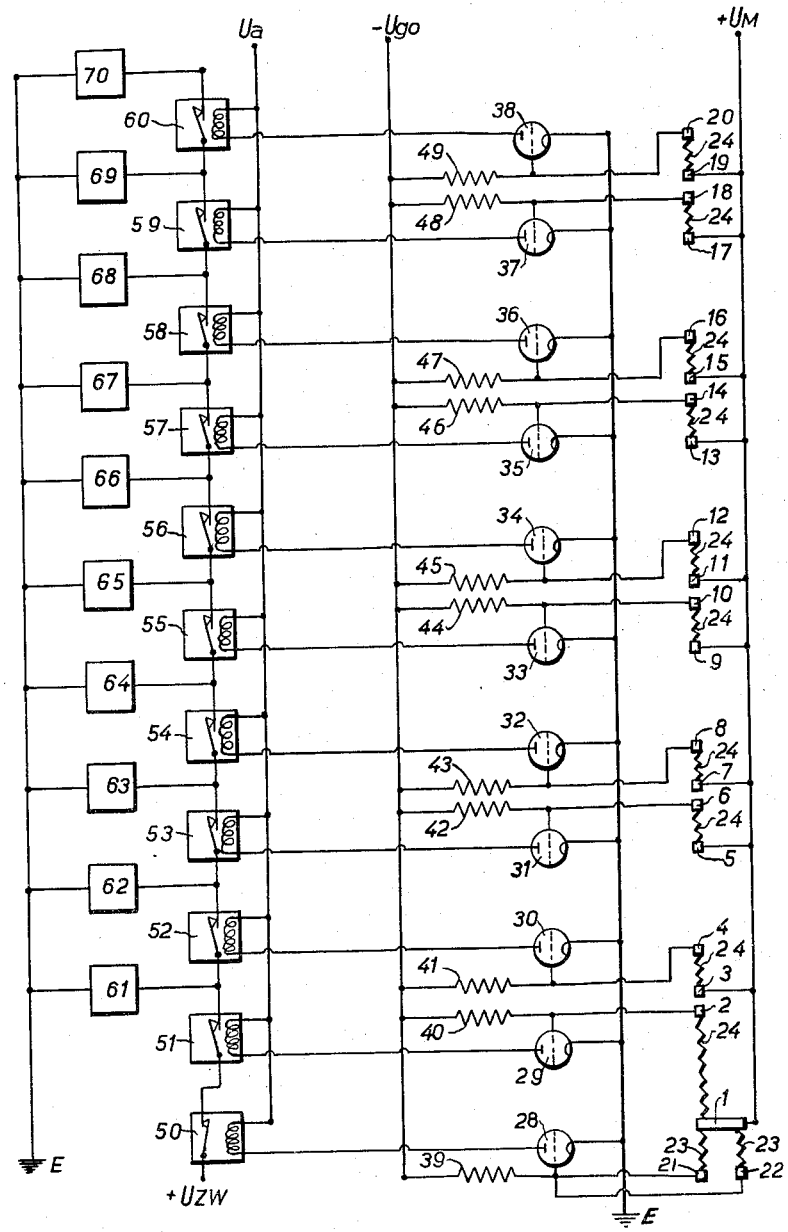
Fig. 2 is a schematic view of the circuit organization for the measuring device shown in Fig. 1.

In Fig. 1, 1 and 2 denote electrodes which together form a recording cell. Numerals 21 and 22 are linear electrodes. A particle 26 which is irregularly shaped moving in the direction of scanning indicated by arrow 27 is measured on its passage over the recording means 1, 2.

The recording means of the photo-electric apparatus coincides with the first photoelectric device of the measuring device. That is to say, the recording means of the photoelectric apparatus (which cannot operate the counting device as long as there is a continuously exposed area between the recording means and one of the linear means) takes the form of the first photoelectric device of the measuring means. Thus, the recording means as described with respect to said copending application and the first photoelectric device as used with respect to the measuring device herein are provided as the same element, such as an electrode pair, separated by a layer with inner photoelectric effect, i.e. a photoconductive layer connecting two metal electrodes to form a photoconductive cell. The terms "recording means" and "first photoelectric device," as used herein, are to be considered synonymous with the term "photoelectric pick-up means," responsive to scanning the optical images of particles to produce electric pulses for operating a counting device.

Reference numeral 1 denotes a live electrode of the recording means, and 2 denotes the second electrode of the recording means. Electrodes 1 and 2 also may be alternatively designated as the first photoelectric device or pick-up means. Numerals 3—4, 5—6, 7—8, 9—10, 11—12, 13—14, 15—16, 17—18, and 19—20 are electrode pairs of the individual elements; one of each electrode pair is connected to a counting means; numerals 21 and 22 are linear electrodes. The shading 23 designates a layer with inner photo-electric effect i.e., a photoconductive layer. Numeral 24 is the layer with inner photo-electric effect between the electrode pairs i.e., a photo-conductive layer connecting two metal electrodes so as to form a photo-conductive cell; 25 an insulating break of the layer 23. The particle image 26, which is, for instance, light on dark background, is just measured in the position shown in the drawing. The first eight counting means (see Fig. 2, 61–68) are actuated by the exposure of the electrode pairs 1—2 to 15—16. Numeral 27 indicates the direction of movement of the particle image. The deepest point of the particle image beneath the electrode 22 is on the next line of scanning. The counting pulse of the recording means or first photoelectric device 1, 2 is thereby blocked as described in the specification of the aforesaid copending application. By suitably closing the circuit, the remaining counting means are not operated though the appertaining photoelectric devices are exposed to light. An example for such a circuit is shown in Fig. 2. Numerals 1–20 refer to the electrodes of Fig. 1 in circuit arrangement, numeral 23 is the layer with inner photo-electric effect, and numeral 24 the same layer between the electrode pairs which are shown as resistances. The electrodes 1, 3, 5, 7, 9, 11, 13, 15, 17, and 19 are connected to the positive measuring voltage $U_M$. The electrodes 21, 22, 2, 4, 6, 8, 10, 12, 14, 16, 18 and 20 are each connected to the grids of the electron tubes 28–38. The grids of the electron tubes 28–38 are connected above the resistances 39–49 to such a negative bias $-U_{go}$ so that the tubes 28–38 are blocked when the photoelectric devices are obscured. This occurs where the particle images are less light transmissive than the surrounding environment, whereby the photoelectric devices are darkened by the particles migrating thereover. The cathodes of all the tubes 28–38 are connected to the earth E. In the anode circuit of the tube 28 there is the closed circuit relay 50, in the anode circuit of each of the tubes 29–38 there is one of the open circuit relays 51–60. The positive voltage $+U_{zw}$ can be connected to the counting means 61–70 over these relays (as shown in the drawing). This circuit fulfils the following conditions; each individual counting means (for instance 65) can be operated only if the appertaining relay (in this case 55) is closed, i.e. the layer 24 between the appertaining electrodes (in this case 9—10) is exposed to light, and all the preceding relays (in this case 51–54) are closed, i.e. the layer between all the preceding electrode pairs (in this case 1, 2, 3, 4, 5, 6, 7, and 8) are exposed to light and, if furthermore, the open circuit relay 50 is closed, i.e. the layer 23 between the electrodes 1–21 or 1–22 is not exposed to light. When multiple grid tubes are used instead of triodes, one can manage without a relay and thereby obtain a higher counting speed. An apparatus as herein described is capable of sizing and counting particles up to a number of 100 per one second. The counting and sizing speed can be substantially enhanced by constructing the photoelectric devices as photo cells and utilizing counting means of higher operating speed.

Figure 3:
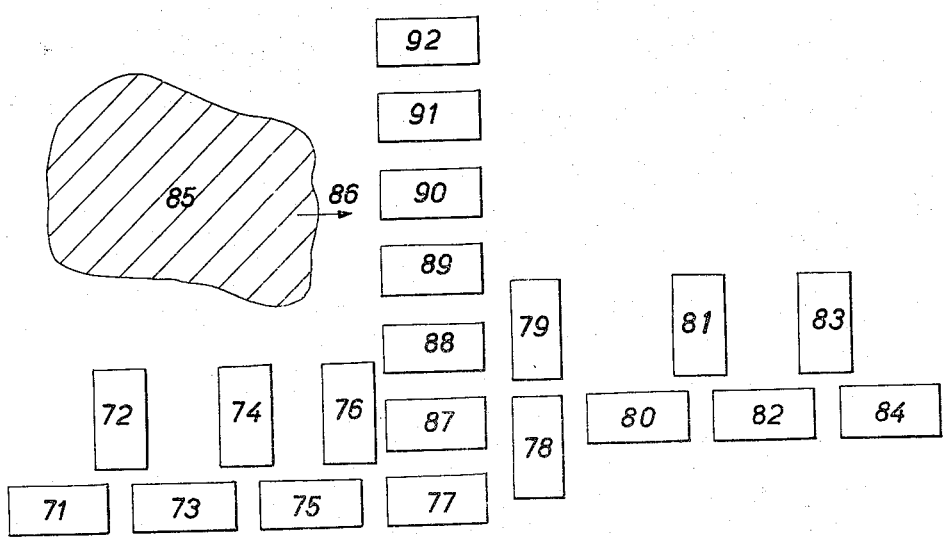
Fig. 3 shows a construction in which the elements of the measuring and photo-electric device are photoelectric cells.

Fig. 3 shows a construction of the apparatus, in which the combined elements of the measuring device and of the photoelectric apparatus are photocells having a photoelectric effect. The photocells 71–84 correspond to the photoelectric apparatus of said copending application and insure that every particle, as for example 85, which moves over the field in scanning direction 86 is counted only once when in a definite position. The interspaces between the photocells 71, 73, 75, 77, and 78, 80, 82, 84 can also be bridged over by the use of mirrors or lenses. 87, 88, 89, 90, 91 and 92 are the photocells of the measuring device; 87 is identical with the recording means of the photoelectric apparatus of said copending application. The number of these photocells can naturally be further multiplied as desired. The pertinent wiring or circuit is shown in Figs. 4 and 5.

Figure 4:
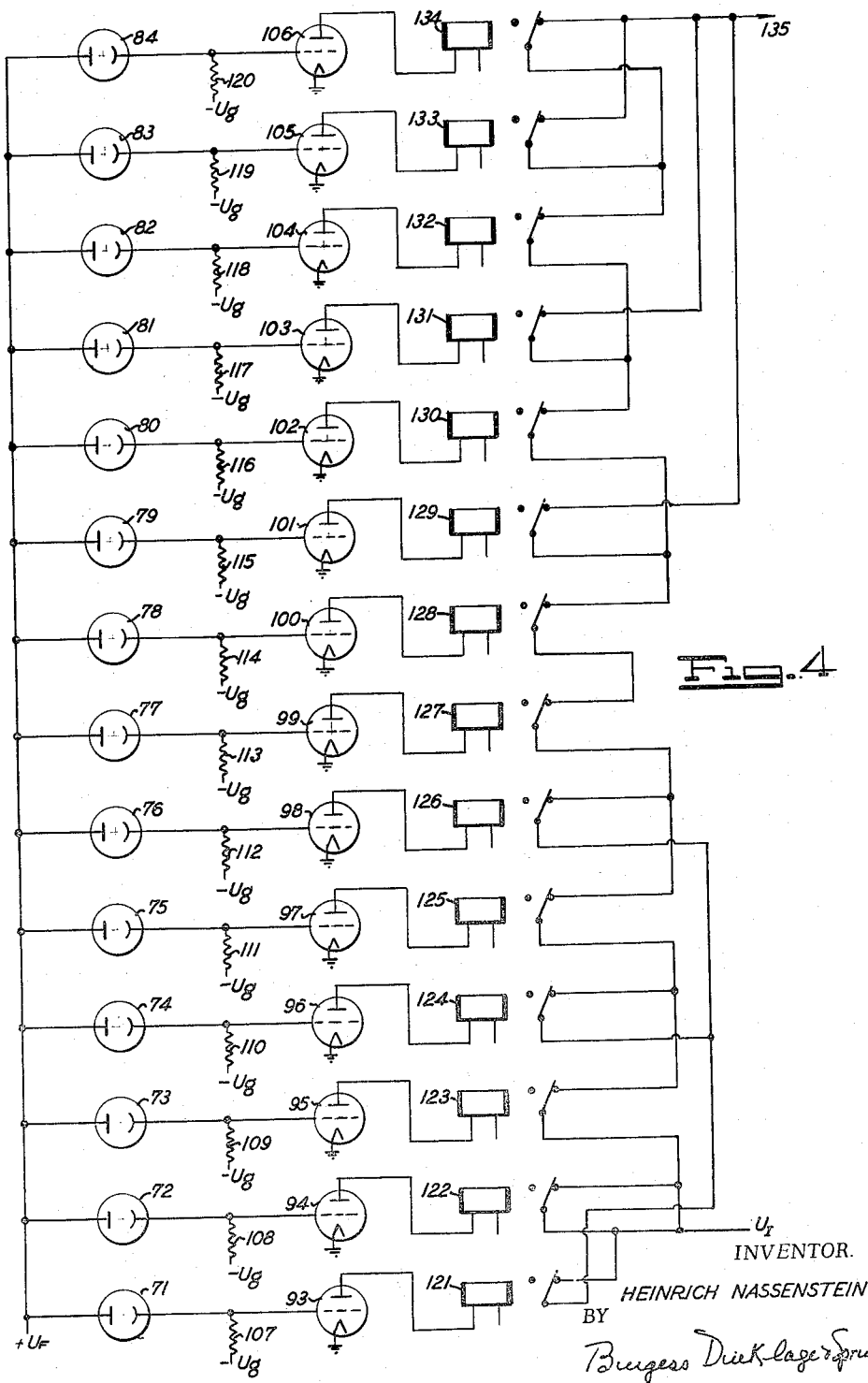
Figs. 4 and 5 show the pertinent wiring connection.
Figure 5:
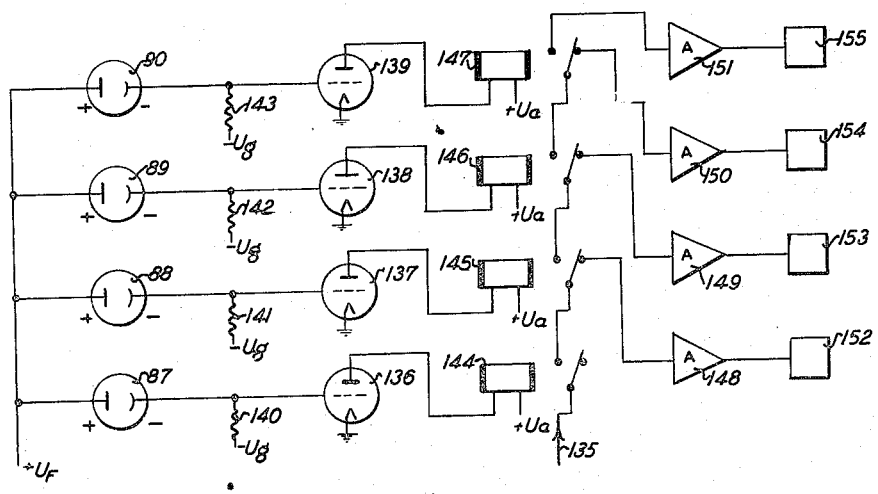

In Fig. 4 each of the photocells 71–84 is connected to the corresponding grid of one of the electron tubes 93–106 and simultaneously to the positive $+U_F$. These tubes receive via the grid resistances 107–120 such a negative initial grid voltage, $U_g$, that no anode current flows into the tubes if the photocell, which is attached to the tube, is not irradiated. If a photocell is irradiated by the images of particles, the grid of the tube receives a positive potential, the anode current flows and activates the relay which lies in the anode circuit of the tubes. These relays are indicated with the numbers 121–134, while $+U_A$ is the anode potential of the tubes. The contacts of the relays 121–134 are so wired that the impulse voltage $U_I$ is always interrupted when at least one of the following conditions is fulfilled:

(1) The photocell 77 or 78 is irradiated;
(2) The cells 76 and 75 are simultaneously irradiated;
(3) The cells 79 and 80 are simultaneously irradiated;
(4) The cells 76, 74 and 73 are simultaneously irradiated;
(5) The cells 79, 81 and 82 are simultaneously irradiated;
(6) The cells 79, 81, 83 and 84 are simultaneously irradiated;
(7) The cells 76, 74, 72 and 71 are simultaneously irradiated.

If one of these conditions is fulfilled, no impulse voltage any longer exists at the connection 135.

In Fig. 5, the further conducting of the impulse voltage in the measuring device is shown. The photocells 87–90 are again, analogously as before, attached to the grid of the electron tubes 136–139. 140–143 are the pertinent grid resistances. 148–151 are supporting steps or amplifiers, which lie in circuit before the members 152–155, which are counters. The connection of the relays 144–147 is here carried out so that only the last one in the row of the irradiated photocells can furnish a counting impulse to the counting device, i.e. a differential curve of the distribution of the amount of particles is obtained. The conditions realized in the circuit for a counting channel (for example 150 and 154) to effect a counting impulse are as follows:

(1) The pertinent photocell (89) is irradiated;
(2) All preceding photocells in the arrangement (87 and 88) are irradiated;
(3) The subsequent photocell (90) is not irradiated;
(4) None of the above cited conditions for the interruption of the impulse voltage is fulfilled.

Condition 3 is realized in the circuit, in that every counting channel receives its impulse potential over the resting contact of the relay positioned next in the row.

This circuit is only one example for the operation of such a device according to the invention. The principle of the device can also be realized in very many other ways, as for example still another impulse donor can be built into the impulse circuit, which gives off counting impulses of exactly defined duration of time. Further, also relays can be replaced by electron tubes. Thereby the measuring time can be considerably shortened. If the photocells do not react to irradiation, but to darkening, that is, if particles are counted which are sensed as dark images on a light background, the circuit can for example be so altered as shown in Fig. 6.

Figure 6:
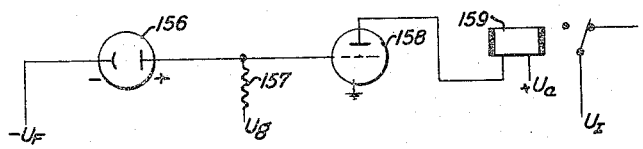
Fig. 6 shows the pertinent wiring required when the photo-electric cells are to be operative on being darkened by a particle.

In Fig. 6, photocell 156 now has a different polarity than before and receives its positive potential $U_g$ via the grid resistance 157. $U_g$, grid resistance and auxiliary potential for the photocell, $U_F$, are so chosen that the tube 158 conveys anode current when the cell 156 is not irradiated. When irradiating the cell 156, the grid of the tubes 158 receives a negative potential, the anode current is interrupted and the relay 159 is closed. If the connection of these elements is carried out in this manner, then the rest of the connections remain unchanged for the relay contacts as well as for the counting part (Fig. 5) and also for the blocking part (Fig. 4). The circuit of the photocells, grid resistances and tubes can, of course, be carried out as in Figs. 4 and 5, but the contacts at the relay must then be correspondingly altered so that actuation takes place upon a darkening. This takes place when changing the contacts of the relay in the rest and working positions. Cells 71–84, 87–90 and 156, shown in Figs. 4, 5 and 6, can naturally also be photocells in this case.

A special advantage of the new apparatus resides in the fact that it allows of counting and sizing particles of any shape and that it is cheaper than all previously known apparatus.

The photo-electric devices of the measuring device can, of course, be designed as photo cells with external photoelectrical effect, or as photo elements or as secondary electron multipliers.

I claim:

1. Apparatus for automatically counting and determining particle size distribution of particles of any size and shape by scanning the optically produced images of the particles, which comprises in combination a measuring means including a plurality of photoelectric means responsive to scanning the optical images of particles to produce electric pulses, of which as many respond as correspond to the size of the particle being measured, said measuring means being connected to operate a counting device upon being actuated by said photoelectric means when each particle image assumes a definite position with respect to said measuring means, said apparatus further including two linear photoelectric means for producing electric pulses responsive to the scanning of optical images of particles, the first of said linear photoelectric means extending parallel to the scanning direction and terminating at a point in a line normal to the scanning direction passing through the nearest of said photoelectric means of said measuring means with respect to said linear photoelectric means, said first linear photoelectric means being spaced from said nearest photoelectric means a distance at most equal to the distance between scanning lines, the second of said linear photoelectric means being parallel to said first linear photoelectric means and beginning at a point beyond said nearest photoelectric means in a line parallel to said scanning direction passing through said nearest photoelectric means and blocking means responsive to the optical images of particles occuping a continuous portion of a scanning area between said nearest photoelectric means and at least one of said linear photoelectric means, said blocking means being capable of blocking the actuation of said measuring means only where said continuous scanning area is occupied by a particle.

2. Apparatus according to claim 1, wherein said measuring means is combined into one cell with said linear photoelectric means.

3. Apparatus according to claim 1, wherein said photoelectric means of said measuring means are arranged in a line vertical to the scanning direction, the said nearest photoelectric means being lowermost in said line.

4. Apparatus according to claim 3, wherein said photoelectric means of said measuring means are connected for actuation of a counting means by each individual photoelectric means only when all the preceding photoelectric means of said measuring means arranged in said line have responded.

5. Apparatus according to claim 1, wherein said photoelectric means of said measuring means are designed as electrodes with intermediate photoresistance.

6. Apparatus according to claim 1, wherein said photoelectric means of said measuring means are photocells with external photoelectric effect.

7. Apparatus according to claim 1, wherein said photoelectric means of said measuring device are photo elements which may be combined in one cell.

References Cited in the file of this patent

UNITED STATES PATENTS

| | | |
|---|---|---|
| 1,880,289 | Sukumlyn | July 21, 1928 |
| 2,085,671 | Powers | June 29, 1937 |
| 2,184,159 | Stockbarger | Dec. 19, 1939 |
| 2,231,186 | Gould | Feb. 11, 1941 |
| 2,480,113 | Betzler | July 9, 1945 |
| 2,487,865 | Glassey | Feb. 27, 1947 |